UNITED STATES PATENT OFFICE.

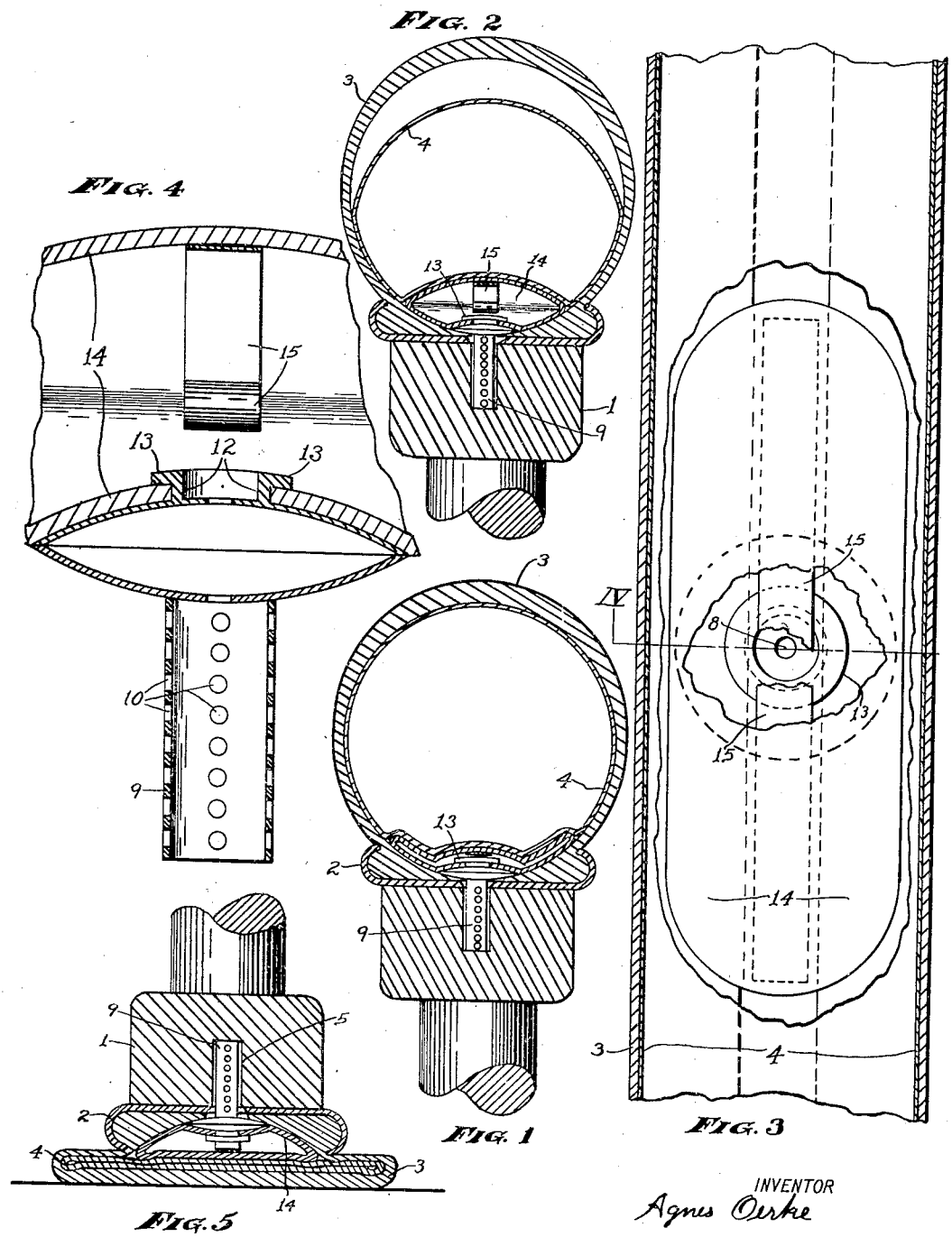
A. OERKE.
DEFLATION ALARM FOR PNEUMATIC TIRED WHEELS.
APPLICATION FILED JULY 27, 1920.
1,359,098.
Patented Nov. 16, 1920.

AGNES OERKE, OF CALDWELL, KANSAS.

DEFLATION-ALARM FOR PNEUMATIC-TIRED WHEELS.

1,359,098.  Specification of Letters Patent.  Patented Nov. 16, 1920.

Application filed July 27, 1920. Serial No. 399,316.

*To all whom it may concern:*

Be it known that I, AGNES OERKE, a citizen of the United States, and a resident of Caldwell, in the county of Sumner and State of Kansas, have invented certain new and useful Improvements in Deflation-Alarms for Pneumatic-Tired Wheels, of which the following is a specification.

My invention relates to deflation alarms for pneumatic tired wheels, and has for its object to provide a device attachable to any pneumatic tired wheel, which device shall emit a series of audible signals upon deflation of the tire to which it is attached, to the end that the puncture or other cause of the deflation may be repaired before the car has traveled far upon the flat tire, thus saving the tire and tube from great damage.

Concisely stated, the invention consists of a whistle mounted in the felly and on the rim of a wheel, an air-bulb connected to the whistle and interposed between the base of the tire casing and the inner tube, and a spring for expanding the bulb when the pressure of the inflated tire-tube upon the bulb is reduced suddenly.

The invention will be more readily understood by reference to the accompanying drawing, in which:—

Figure 1 is a radial sectional view of the device and the rim, felly, casing and inner tube in assembly, the latter being shown as fully inflated. Fig. 2 is a similar view showing the effect of a partial deflation of the tube. Fig. 3 is a plan view of the device, showing the casing in section and the tube in section and partly broken away. Fig. 4 is a detail sectional view on a line IV of Fig. 3, omitting any portion of the tire. Fig. 5 is a cross-section of a tire, rim, felly and the device as at the bottom of a wheel, the tube being fully deflated by the weight. Corresponding numerals refer to corresponding parts throughout.

1 indicates the felly of an automobile wheel; 2, the rim thereof; 3, a tire-casing and 4, the inner tube of the tire. In preparing the wheel for the reception of my attachment it is only necessary to drill a hole 5 radially through the rim and felly at any point thereof, as clearly shown on Figs. 1, 2 and 5. The hole in the rim 2 should then be countersunk, as shown.

The whistle portion of the device consists of a united pair of concavo-convex metal disks 7, in each of which is a small central orifice 8. Rigidly secured to one of these disks is a short metal tube 9, in which I provide several rows of small perforations 10. The aforesaid hole 5 in the felly should be slightly larger than tube 9.

The opposite disk 7 is formed with a short neck 12 provided with a retainer flange 13. The function of said neck and flange is to provide an air-tight connection between the whistle 7—7 and a soft rubber air-bulb 14 which is oblong in shape and is dimensioned to lie between the tire-tube 4 and the base of the tire 3. Said bulb is entirely closed except for its central circular opening which is stretched around the neck 12 on the whistle-disk. (Fig. 4.)

A leaf spring 15 is positioned lengthwise within the bulb, said spring being curved outwardly whereby its middle portion tends to hold the bulb in inflated condition (see Fig. 2) while the ends of said spring bear upon the inner wall of the bulb; in other words, the spring exerts expansive pressure within the bulb, and will hold the bulb expanded against a certain air-pressure in the tire-tube 4, but not against the normal air-pressure in said tube when inflated. During such normal pressure, the bulb 14 will be fully collapsed, as shown on Fig. 1, and, being held immovable, it is apparent that no air will pass through the whistle 7—7 and normally the whistle will be silent.

Now suppose the car to be in motion and that the tire-tube be punctured, or start a leak from any cause: the tire-tube 4 will deflate and decrease its pressure upon the bulb 14, whereupon the bulb will be dilated by the spring 15, and air will pass from the space between the tire-tube 4 and the casing 3, under the outer disk 7, into bore 5, thence into tube 9 and through the whistle, causing a whistling sound. Moreover, it is apparent that every revolution of the wheel affected, thereafter, will recompress the bulb 14, forcing air through the whistle in the reverse direction, and into the space between the tire-tube and its casing. These repeated sounds will be certain to attract the attention of some person in the car, whereupon the car will be stopped and the leak repaired before the car has traveled any distance upon the "flat" tire.

The countersink shown in the rim 2, facilitates the passage of air to and from the bore 5, hence through the whistle.

This device when installed is invisible, and is well protected from dust.

Having described my invention, what I claim as new and desire to secure by Letters Patent, is:

1. A whistle mounted in the felly and on the metal rim of a pneumatic tired wheel, an air-bulb connected to said whistle and interposed between the base of the tire-casing and the inner tube, and a spring for expanding said bulb.

2. A whistle mounted in the felly and on the metal rim of a pneumatic tired wheel, an air-bulb connected with said whistle and interposed between the base of the tire-casing and the inner tube, and a spring within said bulb for expanding said bulb.

3. In combination with the felly and a pneumatic tire thereon, a whistle-tube inserted in a recess in the felly, a whistle connected to said tube and seated upon the periphery of the rim, a resilient air-bulb connected to the side of said whistle opposite said whistle-tube, and a spring adapted to expand said bulb against reduced air-pressure in the inner tube of the tire.

4. In combination with a felly, a rim, and a pneumatic tire thereon, a whistle-tube lying within a recess in the felly, a whistle connected with said tube and seated upon the periphery of the rim, a flexible air-bulb connected to the side of said whistle opposite said whistle-tube, means to permit air to pass from between the tire-tube and casing into said recess, and vice versa, and a spring within said bulb, said spring being adapted to expand said bulb against reduced air-pressure in the inner tube of the tire; substantially as described.

AGNES OERKE.

Witnesses:
W. A. NETHERCOT,
JOSEPH H. ANDERSON.